United States Patent [19]

Heywood

[11] Patent Number: 4,525,433
[45] Date of Patent: Jun. 25, 1985

[54] COMPOSITE MATERIAL

[75] Inventor: Alan E. Heywood, St. Albans, England

[73] Assignee: Johnson Matthey Public Limited Company, Great Britain

[21] Appl. No.: 416,067

[22] Filed: Sep. 8, 1982

[30] Foreign Application Priority Data

Sep. 8, 1981 [GB] United Kingdom ................. 8127071
Nov. 12, 1981 [GB] United Kingdom ................. 8134130

[51] Int. Cl.$^3$ .......................... C22C 1/02; C22C 5/00; C22C 9/00; C22C 39/00
[52] U.S. Cl. .................................... 428/670; 428/672; 65/1; 65/325; 384/157; 384/276; 16/2
[58] Field of Search ................................ 428/670, 672

[56] References Cited

U.S. PATENT DOCUMENTS

| 2,973,283 | 2/1961 | Hill | 428/672 |
| 3,049,577 | 8/1962 | Hill | 428/670 |
| 3,065,526 | 11/1962 | Hill | 428/670 |
| 3,217,404 | 11/1965 | Rhys et al. | 428/670 |
| 3,248,190 | 4/1966 | Woodward et al. | 428/670 |
| 3,696,502 | 10/1972 | Darling . | |
| 4,219,592 | 8/1980 | Anderson et al. | 428/679 |

FOREIGN PATENT DOCUMENTS 1280815  4/1972  United Kingdom .

Primary Examiner—Veronica O'Keefe
Attorney, Agent, or Firm—Cushman, Darby & Cushman

[57] ABSTRACT

Composite materials comprising, inter alia, a dispersion strengthened platinum-palladium-dispersion strengthened platinum sandwich have comparable properties of strength, ductility and electrical conductivity to the rhodium-platinum alloys used for fibre-glass bushings in the glass industry.

15 Claims, 1 Drawing Figure

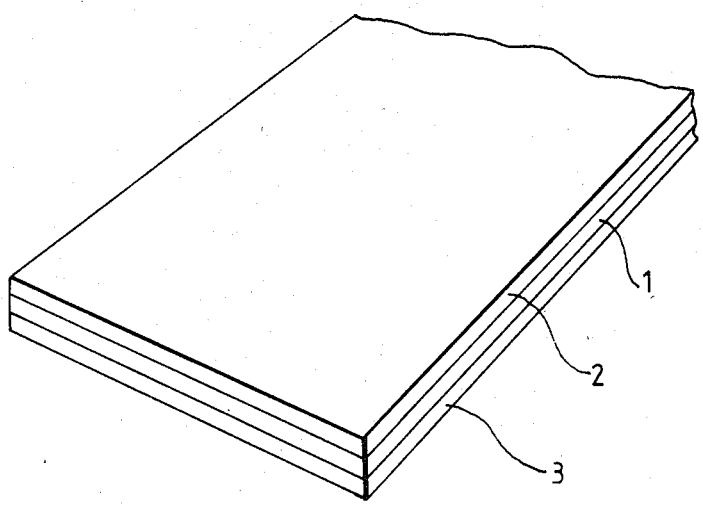

COMPOSITE MATERIAL

This invention relates to composite metallic material and to bodies made therefrom. It is particularly concerned with such material wherein two or more contiguous zones of dissimilar noble metals and/or of alloys containing such metals are bonded together at their interfaces.

Alloys of rhodium and platinum are extensively used for high temperature applications in industry. At temperatures between 1000° C. and 1500° C. for example such alloys containing from 10–40wt % of rhodium, display sufficient strength and ductility to permit bushings fabricated from them to be used in the manufacture of fibre glass, where they are subject to extremely exacting conditions. Two such alloys which are widely used for this purpose are those containing 10 wt % and 20 wt % of rhodium respectively. Rhodium-platinum alloys of the type just referred to are expensive and this has led to the search for cheaper substitute materials. In particular, a range of alloys in which part of the platinum in the 10 wt % rhodium-platinum and 20 wt % rhodium-platinum alloys is replaced by the cheaper platinum group metal palladium, looks fairly promising.

A particular alloy within this range which has been considered is one containing 50 wt % platinum, 40 wt % palladium and 10 wt % rhodium. This alloy, although having good high temperature strength and ductility, does not have the high temperature properties of the 10 wt % rhodium-platinum alloy which it was hoped it might replace. As a result, the alloy can only satisfactorily be used for lightly stressed components required to withstand temperatures up to about 1250° C., say. It would not be suitable for the fabrication of glass fibre bushings where the rhodium-platinum alloys at present employed are very highly stressed, because in order to achieve the required strength, the replacement material would need to be two to three times as thick as the rhodium-platinum alloy it replaces and the price advantage would thereby be lost. In addition, the fact that the electrical resistance of bushings made from the platinum-palladium-rhodium alloy would, as a result of the substantially increased thickness, be significantly lower, would lead to problems because the bushings are, in service, heated by the passage of a very heavy electrical current through them so as to maintain the charge of glass in them in a molten condition.

It is an object of the present invention to provide materials which are cheaper than rhodium-platinum alloys, and especially rhodium-platinum alloys of the type used in the glass industry, but which have comparable properties of strength, ductility and electrical conductivity and which, preferably, also have comparable wetting characteristics.

According to one aspect of the present invention there is provided a composite material wherein two or more contiguous zones of dissimilar noble metals or of alloys containing such metals are bonded together at their interface or interfaces.

Preferably:
(a) the said zones are substantially co-extensive over two major dimensions of each piece of material according to the invention so that the material will comprise two or more noble metal and/or noble metal-containing alloy layers bonded together;
(b) the material is formed of an inner layer or "filling" of noble metal or noble metal alloy sandwiched between two outer layers of noble metal or noble metal alloy;
(c) the said two outer layers are formed of material which is stronger than that of the said inner layer;
(d) the said inner layer comprises:
  (i) metallic palladium or
  (ii) dispersion strengthened palladium or
  (iii) a palladium alloy or a palladium alloy containing up to 45 wt % platinum and up to 10 wt % rhodium
  (iv) a dispersion strengthened palladium alloy or
  (v) any one of (i) to (iv) above including up to 40 wt % platinum so as to arrest diffusion effect between the materials of the inner and outer layers.
(e) at least one of the said outer layers comprises:
  (i) platinum metal or
  (ii) dispersion strengthened platinum or
  (iii) a platinum alloy or
  (iv) a dispersion strengthened platinum alloy or
  (v) a dispersion strengthened gold/platinum alloy, or
  (vi) a gold/platinum alloy;
(f) the dispersion stengthened materials referred to in (d) and (e) above are as described and claimed in commonly owned U.S. Pat. No. 3,696,502 and included herein by reference. Throughout this specification such materials will, for brevity, be described as dispersion strengthened materials.

According to another aspect of this invention there is provided a composite material comprising two outer layers and an inner layer disposed between and bonded to the outer layers, at least one of the outer layers comprising a dispersion strengthened platinum group metal or a dispersion strengthened alloy containing a major proportion of a platinum group metal, and the inner layer comprising a noble metal or noble metal alloy which is dissimilar to the metal or alloy of the said outer layer.

The invention also includes articles made from the composite metallic material of the invention. Examples are crucibles for use in the glass industry and elsewhere as well as bushings and spinnerets and die plates for use in the manufacture of glass fibre.

A composite material comprising a metallic palladium or a dispersion strengthened palladium inner layer clad with at least one outer layer of gold/platinum alloy or a dispersion sterngthened gold/platinum alloy layer, possesses good non-wetting characteristics. Such composite materials, in addition to being used for the purposes indicated above, may also be used for moulds and crucibles for X-ray fluourescence sample preparations where good "release" characteristics are provided by the gold/platinum alloy with the palladium inner layer forming a relatively cheap bulk support material.

In Sections (e) (v) and (e) (vi) above the gold/platinum alloys may contain 2 to 10 wt. % gold and, preferably, 3 to 8 wt. % gold. In section (e) (iii) and (e) (iv) the platinum alloy may contain up to 20 wt. % rhodium and preferably 2 to 10 wt. % rhodium.

Preferably the weight of each of the outer layers of a trimetal sandwich-like composite material according to the invention is up to 30 wt. % and preferably up to 20 wt. % of the inner layer.

The composite materials individually or broadly referred to in this specification may also be used in the manufacture of bursting discs.

The manufacture of a composite material in accordance with this invention will now be described by way of example. The example to be described is shown in the accompanying FIGURE which is a cross section taken through a tri-metal sandwich comprising an inner layer or core of palladium 1 sandwiched between two outer layers of dispersion strengthened materials 2 and 3.

(I) Inner Layer: A plate of palladium of thickness 0.125 inch was prepared as follows:
  (a) both major faces of the plate were cleaned with medium grit emery cloth,
  (b) the so cleaned plate was then further prepared using fine grade emery cloth to produce an even satin-like appearance, and,
  (c) the plate was, thereafter, washed thoroughly using soap and water, rinsed with water and finally dried.

(II) Outer Layers: Outer layers of dispersion strengthened material (either Pt or Pt 10% Rh) produced in accordance with the teaching of commonly owned U.S. Pat. No. 3,696,502 were prepared as follows: The contact side (i.e. that side which was subsequently to be positioned adjacent the inner layer) of each outer layer was prepared using the same steps (a), (b) and (c) as described above for the inner layer.

(III) The inner layer was sandwiched between the cleaned sides of the two outer layers and the three sheets clamped together using even and moderate pressure.

(IV) All the exposed edges of the sandwich were fused-welded together using "heliarc" welding equipment.

(V) The edge-welded sandwich was heated in a furnace purged with nitrogen gas and held at a temperature of 1600° F. for 15 minutes.

(VI) The heated sandwich was removed from the furnace and immediately hot rolled to a thickness of 0.100 inch thick and quenched in cold water. All surfaces were then cleaned with fine emery cloth.

(VII) Thereafter the sandwich was cold-rolled to a thickness of 0.060 inch and trimmed by removing approximately ½ inch from all edges to eliminate any uneven welded edge portions.

(VIII) Finally the sandwich was cold rolled to the finished size required.

In the above, no reference has been made to the initial thickness of the outer layers of dispersion strengthened material which is selected in accordance with the required final weight percentages of dispersion strengthened material to the pure palladium core.

The hot rolling carried out under step VI above, causes the three sheets to become diffusion bonded to one another. Diffusion bonding is a metallurgical bond in that atoms of both sides of an original interface migrate to the opposite side, thereby virtually eliminating the interface. In almost all cases such as a bond is stronger than either of the original materials.

Composite, or trimetal materials made in accordance with this invention can be used to replace pure platinum and alloys thereof previously used in the manufacture of laboratory ware, crucibles and similar articles without any appreciable loss of performance. Thus, articles made from the composite material of the invention will result in an immediate reduction in intrinsic metal value for the user because palladium is currently priced at a fraction of the price of platinum. When compared with pure palladium, the composite material of the invention possesses increased strength, corrosion and oxidation resistance. Furthermore, since palladium possesses poor corrosion/oxidation resistance, it cannot be used for such items as crucibles, bushings and spinnerets but such articles can, however, be made from the composite material of the invention.

It will be appreciated from the foregoing that the composite or trimetal sandwich has the advantage of providing the properties of dispersion strengthened platinum (or alloys thereof) where needed on the surface of an article whilst lower cost palladium may constitute the bulk of the material.

I claim:

1. A composite material comprising two outer layers comprising a platinum group metal or alloy thereof and an inner layer disposed between and bonded to the outer layers, at least one of the outer layers comprising a member selected from the group consisting of a dispersion strengthened platinum group metal and a dispersion strengthened alloy containing a major proportion of a platinum group metal, and the inner layer comprising a noble metal or noble metal alloy which is dissimilar to the metal or alloy of the said outer layers, said inner layer comprising a member selected from the group consisting of metallic palladium, dispersion strengthened palladium, a palladium alloy and a dispersion strengthened palladium alloy.

2. A composite material according to claim 1 wherein the other outer layer comprises a metallic material selected from the group consisting of platinum metal, dispersion strengthened platinum, a platinum alloy, a dispersion strengthened platinum alloy, a dispersion strengthened gold/platinum alloy, a gold/platinum alloy and a dispersion strengthened rhodium/platinum alloy.

3. A composite material according to claim 2 wherein the dispersion strengthened gold/platinum alloy contains 2 to 10 wt % gold.

4. A composite material according to claim 3 wherein the dispersion strengthened gold/Platinum alloy contains 3 to 8 wt % gold.

5. A composite material according to claim 2 wherein the dispersion strengthened rhodium/platinum alloy contains up to 20 wt % rhodium.

6. A composite material according to claim 5 wherein the dispersion strengthened rhodium/platinum alloy contains 2 to 10 wt % rhodium.

7. A composite material according to claim 1 wherein the inner layer contains up to 40 wt % platinum.

8. A composite material according to claim 1 wherein adjacent layers are interfacially bonded by diffusion bonding.

9. A composite material according to claim 8 wherein edges of the composite material are welded by fusion welding.

10. A die-plate for use as the base plate of a bushing for holding molten glass in the manufacture of glass fibre, the die-plate comprising a composite material according to claim 1.

11. A crucible comprising an alloy according to claim 1 and used in the preparation of X-ray fluourescence samples.

12. A mould comprising an alloy according to claim 1 and used in the preparation of X-ray fluourescence samples.

13. A bursting disc comprising a material as claimed in claim 1.

14. A composite material comprising two outer layers and an inner layer disposed between and bonded to the outer layers, one of the outer layers comprising a member selected from the group consisting of a dispersion strengthened platinum group metal and a dispersion strengthened alloy containing a major proportion of a platinum group metal, the other outer layer comprising a metallic material selected from the group consisting of platinum metal, dispersion strengthened platinum, a platinum alloy, a dispersion strengthened platinum alloy, a dispersion strengthened platinum alloy, a dispersion strengthened gold/platinum alloy containing 2 to 10 wt % gold, a gold/platinum alloy and a dispersion strengthened rhodium/platinum alloy containing up to 20 wt % rhodium, and the inner layer comprising a noble metal or noble metal alloy which is dissimilar to the metal or alloy of said outer layers, said inner layer comprising a member selected from the group consisting of metallic palladium, dispersion strengthened palladium, a palladium alloy and a dispersion strengthened palladium alloy.

15. A composite material according to claim 14 wherein the dispersion strengthened platinum alloy is selected from the group consisting of dispersion strengthened gold/platinum alloy containing 3–8 wt % gold and dispersion strengthened rhodium/platinum alloy containing 2–20 wt % rhodium.

* * * * *